(12) United States Patent
Perner

(10) Patent No.: US 6,847,669 B2
(45) Date of Patent: Jan. 25, 2005

(54) SHEET-LIKE ELECTROOPTICAL COMPONENT, LIGHT-GUIDE CONFIGURATION FOR SERIAL, BIDIRECTIONAL SIGNAL TRANSMISSION AND OPTICAL PRINTED CIRCUIT BOARD

(75) Inventor: Martin Perner, München (DE)

(73) Assignee: Infineon Technologies AG, Munich (DE)

( * ) Notice: Subject to any disclaimer, the term of this patent is extended or adjusted under 35 U.S.C. 154(b) by 314 days.

(21) Appl. No.: 10/137,906

(22) Filed: May 3, 2002

(65) Prior Publication Data

US 2002/0196502 A1 Dec. 26, 2002

(30) Foreign Application Priority Data

May 3, 2001 (DE) .......................................... 101 21 529

(51) Int. Cl.[7] .................................................. H01S 5/00
(52) U.S. Cl. .......................................... 372/50; 285/14
(58) Field of Search ............................ 372/50, 54, 45, 372/64, 10, 9, 104, 38.02, 31, 107, 108; 385/36, 31, 24

(56) References Cited

U.S. PATENT DOCUMENTS 5,757,836 A    5/1998  Jiang et al. ................... 372/50

FOREIGN PATENT DOCUMENTS

DE           19834090 A1    2/2000

OTHER PUBLICATIONS

Published International Application No. 95/26051 (Swirhun et al.), dated Sep. 28, 1995.

Published International Application No. 85/03179 (Hase), dated Jul. 18, 1985.

"Silicon PIN Photodiode With Very Short Switching Time", OSRAM Opto Semiconductors, Regensburg, Germany, Feb. 22, 2001, pp. 1–5.

"GaAs Infrared Emitter", OSRAM Opto Semiconductors, Regensburg, Germany, Jan. 1, 2000, pp. 1–5.

GaAlAs–Infrared–Emitter (880 nm) and Si–Phototransistor, OSRAM Opto Semiconductors, Regensburg, Germany, Jan. 1, 2002, pp. 1–5.

*Primary Examiner*—Mingun Oh Harvey
*Assistant Examiner*—Tuan N. Nguyen
(74) *Attorney, Agent, or Firm*—Laurence A. Greenberg; Werner H. Stemer; Gregory L. Mayback

(57) ABSTRACT

A flat or sheet-like electrooptical component for sending and receiving electrical and optical signals includes a central emission region with at least one light-emitting device for sending out optical signals. A sensor region is arranged around the emission region, and at least one device for sensing optical signals is configured in the sensor region. A reflector region is arranged around the sensor region for reflecting incident electromagnetic radiation. The electrooptical component also includes a device for driving the light-emitting device based on incoming electrical signals, and a device for outputting electrical signals based on received optical signals.

19 Claims, 3 Drawing Sheets

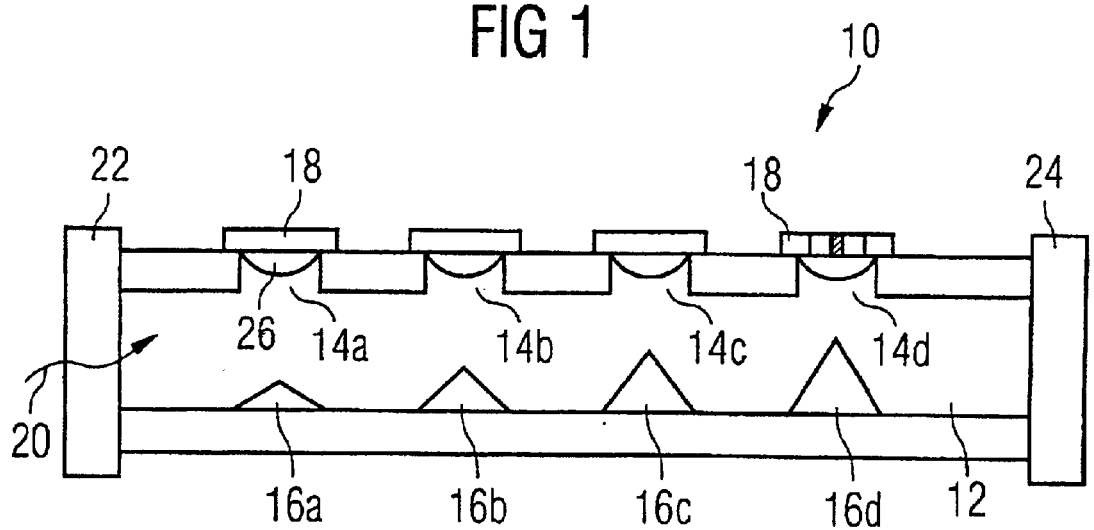
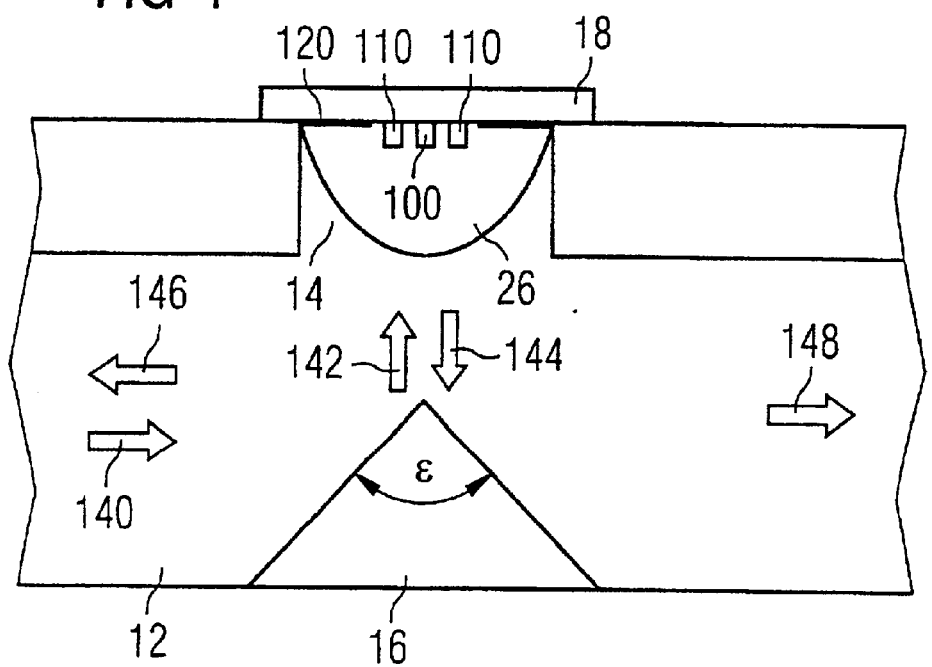

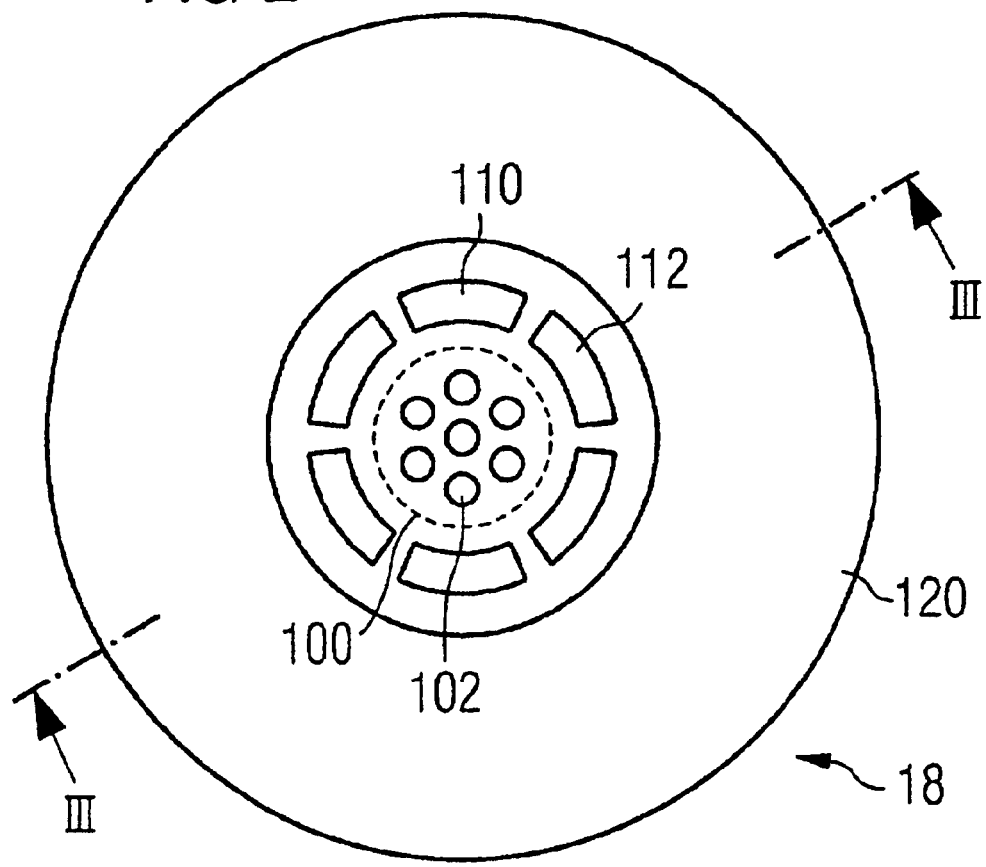
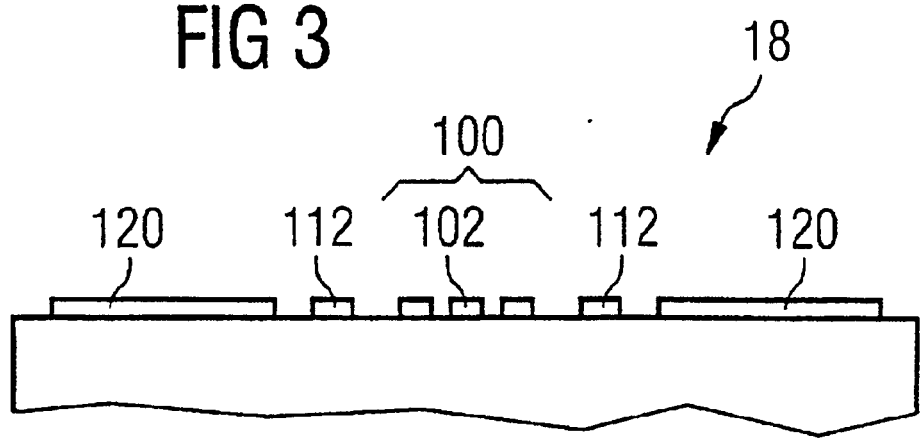

SHEET-LIKE ELECTROOPTICAL COMPONENT, LIGHT-GUIDE CONFIGURATION FOR SERIAL, BIDIRECTIONAL SIGNAL TRANSMISSION AND OPTICAL PRINTED CIRCUIT BOARD

BACKGROUND OF THE INVENTION

Field of the Invention

The invention relates to the field of optical signal transmission. In particular, the invention relates to a flat or sheet-like electrooptical component for sending and receiving electrical and optical signals. The invention also relates to a light-guide configuration containing such components for serial, bidirectional signal transmission, and to an optical printed circuit board.

Electrical printed circuit boards for driving electronic devices are commonplace in modern electronics. For many years, the speed with which the devices are operated has steadily increased. Modern processors already run at clock rates of above 1 GHz. Clock rates of several 100 MHz are aimed for and in some cases are already realized, even for comparatively slow memory chips.

As the speed of signal transmission increases in purely electrical printed circuit boards, difficulties increasingly occur. While it is possible in low-frequency operation at several MHz to realize, for example, a parallel serial bus concept without any problems, in high-frequency operation a range of problems arise.

For example, when using high frequencies with signal lines routed in parallel, the problem of crosstalk in which signal changes on one line induce interfering signals on neighboring lines increasingly occur. To remedy this, the lines must either be routed far apart from one another, which reduces the achievable data parallelism, or elaborate measures to shield neighboring lines from one another must be taken.

In the transmission of signals, distortions of the signal waveform also occur, in particular, in the case of signals traveling over relatively great distances with relatively long transit times, and it is necessary for this to be elaborately corrected or taken into account during the design of a circuit.

In the DRAM (Dynamic Random Access Memory) area, for example, so far there has been a reliance on purely electrical connections and terminals, since they can be electrically wired to printed circuit boards and to other components with good soldered bonds. With switching times of 1 to 5 ns, corresponding to 200 to 1000 MHz, however, high-frequency phenomena become noticeable, and can only be countered by good shielding and signal line reduction. A higher signal transmission rate consequently restricts the usable parallelism, a nuisance which has to be overcome to obtain further increases in overall performance.

Consequently, altogether considerable design and production effort has to be undertaken with electrical printed circuit boards to ensure interference-free and transit-time-adapted signal or data transmission at high signal frequencies.

To obviate these problems, optical connections have also been used. However, optical connections generally only take a unidirectional form between an electrooptical signal generator and an electrooptical signal receiver and then either do not allow read/write operation, or require two separate signal lines between the two end stations. Genuine bidirectional signal transmission between two stations that can in each case operate as a transmitter and receiver has until now required complex electrooptical circuitry.

If the transmitted signals are picked off serially at several points along the link, with all of the known methods this leads to a significant deterioration in the signal, so that repeated optical coupling out is only possible to a very restricted extent.

At the same time, the effective optical coupling in and out of light into and from an optical line is contrary to the requirements for simplest possible, interference-free bidirectional signal transmission. This is attributable to the wave character of the light and the associated directed, transversal electromagnetic signal propagation. Electrical signal transmissions on purely electrical printed circuit boards are unaffected by this problem, since electric current can be coupled into or out of a current conductor without great effort.

On the level of the contact pads, a purely optical solution has the disadvantage that the optical interface for bidirectional communication has to have both an input and an output, which with massive parallelism and simultaneous miniaturization of the components, leads to problems of space (known as pad-out).

A solution to the problem provided by components for signal multiplexing and processing, for instance in fiber-optic technology, requires high-quality components, which are consequently correspondingly complex to produce and are expensive. Bidirectional communication is then not possible for many applications on account of the complex structural form, or is not cost-effective on account of the associated costs.

Similarly, it is often not possible to achieve optical signal transmission with continuity, since optical signals are refreshed. In other words, a residual optical signal is converted into an electrical signal, amplified, and is optically re-emitted.

SUMMARY OF THE INVENTION

It is accordingly an object of the invention to provide a substantially flat electrooptical component for sending and receiving optical and electrical signals which overcomes the above-mentioned disadvantages of the prior art apparatus of this general type.

The invention is based on the object of specifying a configuration for signal transmission which avoids the disadvantages mentioned, which in particular, makes it possible to achieve serial bidirectional signal transmission and which is also suitable for the parallel transmission of high-frequency signals in a way which can be easily realized. In this respect there is also the object of specifying a low-cost electrooptical contact pad that can form an interface between an optical signal transmission link and electrical devices.

With the foregoing and other objects in view there is provided, in accordance with the invention, a flat or sheet-like electrooptical component for sending and receiving electrical and optical signals. The electrooptical component includes:

- a central emission region, in which at least one light-emitting device for sending out optical signals is arranged,
- a sensor region, arranged around the emission region, with at least one device for receiving optical signals,
- a reflector region, arranged around the sensor region, for reflecting incident electromagnetic radiation, and
- a device for driving the light-emitting device based on incoming electrical signals, and a device for outputting electrical signals based on received optical signals.

Realizing the electrooptical component is based on the idea of providing optical bidirectional drivability, in that a transmitter and receiver of optical signals are integrated in a space-saving manner in a small space, and on the idea of providing serial signal relaying at the same time. Consequently, serving further components without great losses is made possible by a high overall reflectivity of the configuration.

It is preferred for the central emission region to have a plurality of light-emitting semiconductor devices, in particular laser diodes, to increase the operational reliability. A failure of one or of some of the light-emitting devices then does not lead to a failure of the entire component.

It is particularly preferred for the central emission region to have a plurality of surface-emitting laser diodes, which act as punctiform light sources of great beam divergence. The wavelengths of such VCSELs (Vertical Cavity Surface Emitting Lasers) in the red or near infrared range are well-suited for optical signal transmission.

It goes without saying, however, that light-emitting diodes or other radiation sources with wavelengths from the ultraviolet to the infrared spectral range can also be used within the scope of the invention. With these, the principle applies that the achievable information density increases as the wavelength becomes shorter, and consequently the frequency becomes higher.

In one configuration, the sensor region is arranged in an annular form around the central emission region. The sensor region expediently includes a plurality of photodiode segments, so that the failure of one segment can be tolerated overall for the functionality of the component.

It has been found to be particularly advantageous if the reflector region is arranged in an annular form around the sensor region. The reflector region is expediently formed by a metal layer or a Bragg reflector layer.

Furthermore, the electrooptical component advantageously includes collimating optics for concentrating incoming radiation and for making outgoing radiation parallel.

A micro-lens arranged centrally on the component surface is preferred in this case, but the collimating optics may also be formed for example by a micro-parabolic mirror.

In an advantageous configuration, the light-emitting device is designed for emitting light of a first wavelength, and the device for sensing optical signals is designed for receiving light of a second wavelength, different from the first. This allows signals to be simultaneously sent and received separately without interference.

The components are advantageously produced based on a direct semiconductor material, for example GaAs/AlGaAs. This additionally allows fast receiving and sending electronics to be integrated on the regions adjacent to the electrooptical component.

With the foregoing and other objects in view there is also provided, in accordance with the invention, a light-guide configuration for serial, bidirectional signal transmission. The configuration includes:

- an optical signal line for carrying electromagnetic radiation along a principal direction of the line,
- a plurality of optical access points, arranged along the principal direction of the optical signal line, for coupling electromagnetic radiation in or out along a direction that is substantially perpendicular to the principal direction of the line,
- a plurality of diffusers arranged within the optical signal line and respectively assigned to an optical access point, and
- a plurality of flat or sheet-like electrooptical components, described above, each arranged on a coupling-in/coupling-out surface of a respective optical access point.

In this case, each diffuser interacts with the assigned optical access point in such a way that part of the radiation carried in the optical signal line can be coupled out through the diffuser via the assigned optical access point from the optical signal line to the electrooptical component, and incident radiation from the electrooptical component of the optical access point can be coupled into the optical signal line via the assigned diffuser.

With the foregoing and other objects in view there is also provided, in accordance with the invention, an optical printed circuit board that contains a plurality of such light-guide configurations disposed in parallel. Since the optical signals in neighboring optical signal lines do not interfere with one at another, close parallel routing of the signal lines is possible.

Other features which are considered as characteristic for the invention are set forth in the appended claims.

Although the invention is illustrated and described herein as embodied in a flat electrooptical component, a light-guide configuration for serial, bidirectional signal transmission and an optical printed circuit board, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 schematically shows an exemplary embodiment of a light-guide configuration;

FIG. 2 schematically shows an exemplary embodiment of an electrooptical contact pad;

FIG. 3 is a cross-sectional view through the electrooptical contact pad taken through the line III—III shown in FIG. 2;

FIG. 4 is a more detailed view of an optical access point of the light-guide configuration shown in FIG. 1;

DESCRIPTION OF THE PREFERRED EMBODIMENTS

Figure 5:
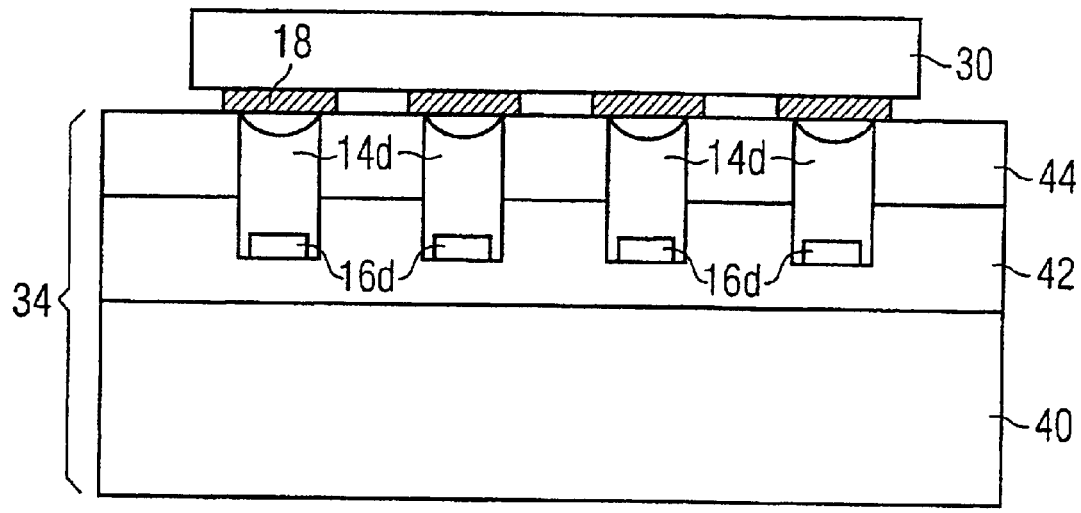
FIG. 5 is a cross-sectional view of an exemplary embodiment of an optical printed circuit board.

Referring now to the figures of the drawing in detail and first, particularly, to FIG. 1 thereof, there is shown a light-guide configuration, denoted generally by 10, into which an optical signal 20 is coupled via an optical connector 22. The light signal 20 propagates in FIG. 1 in the optical signal line 12 from the left side to the right side of the configuration 10 and thereby passes the optical access points 14a to 14d one after the other. The light propagation is in this case determined by multiple scattering at the reflecting side surfaces of the signal line 12, is thus substantially diffuse and not restricted to one or a few modes.

Each of the optical access points 14a to 14d has an assigned prismatic diffuser 16a to 16d, which is respectively provided opposite the inlet of the optical access point on a lateral surface of the optical signal line 12. By light scattering at the prisms 16a to 16d, part of the radiation intensity propagating in the optical signal line 12 is in each case coupled out into the optical access points 14a to 14d and is taken up by electrooptical contact pads 18.

Radiation that has passed through the entire optical signal line 12 is absorbed in an absorber 24 at the end of the optical signal line 12 in order to obtain a defined termination of the signal line and to avoid interfering retroreflective effects.

The configuration of the contact pads 18 is explained in more detail below in conjunction with FIGS. 2 and 3. The contact pad 18 has a GaAs support 130, on the surface of which an emission region 100 is centrally arranged. For reasons of redundancy, the emission region 100 includes a plurality, seven in the exemplary embodiment, of what are known as VCSELs (Vertical Cavity Surface Emitting Lasers) 102. These VCSEL's 102 are ultra-quickly switching surface-emitting lasers that represent a punctiform light source of great beam divergence. Each of the VCSELs 102 has an extent of approximately 10 µm, so the entire emission region 100 has a diameter of approximately 50 µm.

A segmented ring 110 including a plurality of photodiodes 112 (six photodiodes in the exemplary embodiment) is arranged around the emission region 100. Each of the photodiodes 112 respectively has a width of approximately 10 µm and together they cover the entire circumference of the emission region.

The segmented ring 110 with the photodiodes 112 is surrounded by a highly reflective ring region 120, which has a width of approximately 200 µm. In the exemplary embodiment, the ring region 120 includes a vapor-deposited quarter-wave Bragg mirror, the reflectivity of which is designed for the light wavelength used, here 940 nm. The Bragg mirror of the reflector ring 120 can in this case be applied simultaneously with the Bragg reflector layer required for the laser resonators of the VCSELs 102.

The total reflectivity of the contact pad 18 is 95–99%, so that a large part of the incident radiation is reflected back into the optical signal line 12 in order to relay the signal. The diameter of the entire contact pad 18 is approximately 500 µm, and is consequently slightly larger than the coupling-in/coupling-out opening of the optical access point 14. In the exemplary embodiment, all of the components of the contact pad are produced on a GaAs/AlGaAs basis.

As can be seen in particular from FIG. 4, a micro-lens 26 is arranged centrally on the contact area. The micro-lens 26 concentrates incident radiation onto a central region of the contact pad 18 and consequently onto the segmented ring 110 with the photodiodes 112. Radiation, which is emitted by the emission region 100, is made parallel by the micro-lens 26 and is radiated into the optical access point 14. Incident radiation that is not absorbed in the central region 100, 110 is reflected back highly effectively by the Bragg reflector layer 120.

Returning to FIG. 1, the signal transmission in the light-guide configuration takes place bidirectionally and serially. An input signal can be picked off successively (serially) at a plurality of optical access points 14a–14d and the contact pads 18 provided there. For this purpose, each access point through the electrooptical pads 18 is set up both for receiving and sending optical signals (bidirectional transmission).

To ensure optimum transmission of the optical signals to the serially arranged access points 14a to 14d, and a constant coupling-in performance for all of the access points 14a to 14d, the shape and size of the prisms 16a to 16d along the direction of propagation of the optical signal line 12 are made to match one another.

As indicated in FIG. 1, the prisms 16a to 16d have a constant base area. However, the apex angle decreases along the direction of propagation, so the height of the prisms increases from prism 16a through prisms 16b and 16c to prism 16d. As a result, an increasingly relative proportion of the radiation 20 still propagating in the light guide is coupled out via the prisms, which compensates for the decreasing radiation power after each coupling-out process.

On the other hand, the constant base area of all the prisms 16a to 16d ensures a constant coupling-in performance for each of the optical access points 14a to 14d.

FIG. 4 shows the path of rays at an optical access point 14 during the operation of the light-guide configuration. In FIG. 4, the direction of propagation of the light in the signal line 12 runs from left to right. An optical signal pulse 140 falls from the left onto the diffuser prism 16. A proportion 142 of the radiation, corresponding to the ratio of the height of the prism 16 to the overall height of the signal line 12, is deflected toward the optical access point 14. A small part of the radiation (1–5%) is absorbed by the optical contact pad 18. The optical signal is thereby picked up by the photodiodes 112 and is converted into corresponding electrical signals.

The greatest proportion 144 of the radiation falling on the contact pad 18 is reflected back by the reflector ring 120 to the diffusing prism and is coupled again into the optical signal line 12. The radiation intensity 148 transmitted from the optical access point consequently corresponds to the sum of the intensity propagating past the diffusing prism 16 and half of the intensity reflected back from the contact pad 18.

If the contact pad 18 is operating as an emitter, the emitted intensity 144 is coupled half-and-half in both directions of propagation 146, 148 of the optical signal line 12. The coupled-in optical signal is consequently available both at the input or output of the signal line 12 and at further connected optical access points 14.

An exemplary embodiment of an optical printed circuit board 34 with four parallel optical signal lines 12 is represented in section in FIG. 5. The optical signals coupled in via the optical connector 22 are led out serially on each signal line 12 to corresponding terminals of the devices 30, which are memory chips in the exemplary embodiment.

The printed circuit board 34 in this case includes three layers, a lower printed circuit board 40, which contains electrical connecting lines, a printed circuit board 42 containing the optical signal lines 12, and an upper printed circuit board 44.

The upper printed circuit board 44 terminates the optical signal lines between the optical access points 14 in the upward direction. For each optical access point 14, the upper printed circuit board 44 has an aperture, on the upper side of which the described contact pads 18 are arranged. Connected to the electrical outputs of the contact pads 18 are electrical inputs of a device 30. This takes place in a way that is known per se, for example, by using solder balls provided at the inputs of the device 30.

Figure 6:
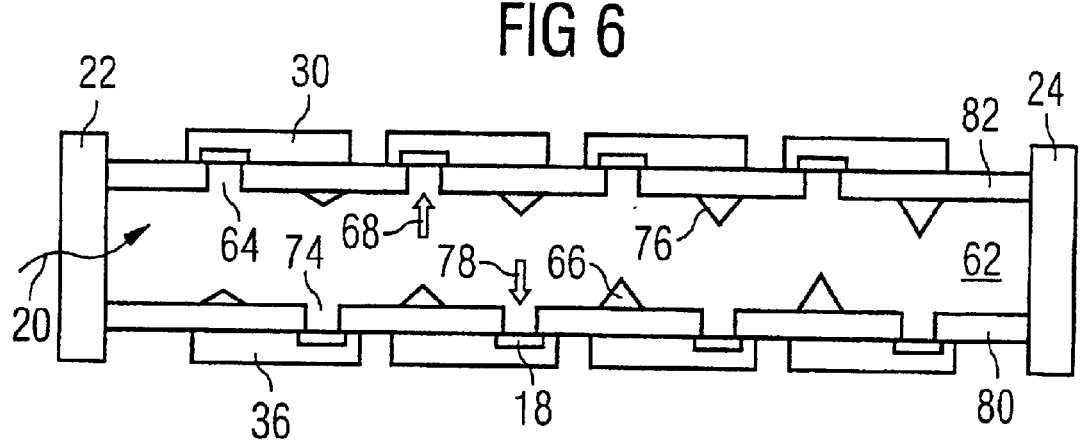
FIG. 6 is a schematic representation of another exemplary embodiment of a light-guide configuration.

FIG. 6 shows a further embodiment of the light-guide configuration, which differs from the configuration of FIG. 1 in that devices 30, 34 are arranged on both sides of the optical signal line 62.

In a corresponding way, the optical signal line 62 has optical access points in the upward direction (reference numeral 64) and downward direction (reference numeral 74). In each case, the optical access points 64, 74 are arranged perpendicularly to the direction of propagation of the radiation in the signal line 62. Arranged respectively opposite the optical access points 64, 74, in a way analogous to the configuration described in conjunction with FIG. 1, are diffusing prisms 66, 76, which couple out a proportion of the propagating radiation in the upward direction (reference numeral 68) or in the downward direction (reference numeral 78) to the electrooptical contact pads 18.

The upper and lower printed circuit boards 80, 82 in each case have optical apertures. At least one of the printed circuit boards is also designed for carrying electrical signals, in particular supply voltages for electrooptical components.

I claim:

1. A substantially flat electrooptical component for sending and receiving electrical and optical signals, comprising:
    a central emission region;
    at least one light-emitting device for sending out optical signals, said light-emitting device being configured in said central emission region;
    a sensor region configured around said emission region;
    at least one light-sensing device for sensing optical signals, said light-sensing device being configured in said sensor region;
    a reflector region configured around said sensor region for reflecting incident electromagnetic radiation;
    a device for driving said light-emitting device based on incoming electrical signals; and
    a device for outputting electrical signals based on received optical signals.

2. The component according to claim 1, wherein said central emission region includes a plurality of light-emitting semiconductor devices.

3. The component according to claim 1, wherein said central emission region includes a plurality of laser diodes.

4. The component according to claim 1, wherein said central emission region includes a plurality of surface-emitting laser diodes.

5. The component according to claim 1, wherein said sensor region is configured in an annular form around said central emission region.

6. The component according to claim 1, wherein said sensor region includes a plurality of photodiode segments.

7. The component according to claim 1, wherein said reflector region is configured in an annular form around said sensor region.

8. The component according to claim 1, wherein said reflector region is formed by a layer selected from the group consisting of a metal layer and a Bragg reflector layer.

9. The component according to claim 1, comprising: collimating optics for concentrating incoming radiation and for making outgoing radiation parallel.

10. The component according to claim 9, comprising: a component surface; said collimating optics being formed by a micro-lens configured centrally on said component surface.

11. The component according to claim 1, wherein:
    said light-emitting device is designed for emitting light of a first wavelength; and
    said light-sensing device is designed for receiving light of a second wavelength that is different than said first wavelength.

12. A light-guide configuration for serial, bidirectional signal transmission, comprising:
    an optical signal line having a principal direction for carrying electromagnetic radiation along said principal direction;
    a plurality of optical access points for coupling electromagnetic radiation in a direction that is substantially perpendicular to said principal direction of said optical signal line, said plurality of said optical access points configured along said principal direction of said optical signal line;
    a plurality of diffusers configured within said optical signal line, each one of said plurality of said diffusers being assigned to a respective one of said plurality of said optical access points; and
    a plurality of substantially flat electrooptical components;
    each one of said plurality of said optical access points having a coupling surface;
    each one of said plurality of said substantially flat electrooptical components configured on said coupling surface of a respective one of said plurality of said optical access points;
    each one of said plurality of said substantially flat electrooptical components including:
        a central emission region,
        at least one light-emitting device for sending out optical signals, said light-emitting device being configured in said central emission region,
        a sensor region configured around said emission region,
        at least one light-sensing device for sensing optical signals, said light-sensing device being configured in said sensor region,
        a reflector region configured around said sensor region for reflecting incident electromagnetic radiation,
        a device for driving said light-emitting device based on incoming electrical signals, and
        a device for outputting electrical signals based on received optical signals;
    each one of said plurality of said diffusers interacting with a respective one of said plurality of said optical access points such that part of the radiation carried in said optical signal line can be coupled out by said one of said plurality of said diffusers and said one of said plurality of said optical access points to a respective one of said plurality of said electrooptical components; and
    each one of at least some of said plurality of said electrooptical components providing incident radiation being coupled into said optical signal line by a respective one of said plurality of said optical access points and a respective one of said plurality of said diffusers.

13. The light-guide configuration according to claim 12, wherein:
    each one of said plurality of said diffusers has a size and a matching shape such that when electromagnetic radiation is carried in said optical signal line, an absolute value of a coupled-out radiation power is substantially constant at each one of said plurality of said optical access points along said principal direction of said optical signal line.

14. The light-guide configuration according to claim 12, wherein:
    each one of said plurality of said diffusers has a size and a matching shape such that a relative proportion of coupled-in radiation power is substantially equal for each one of said plurality of said optical access points along said principal direction of said optical signal line.

15. The light-guide configuration according to claim 12, wherein: said plurality of said diffusers are formed as prisms.

16. The light-guide configuration according to claim 12, wherein:

said plurality of said diffusers are formed as prisms;

each one of said prisms has a base area; and said base area of each one of said prisms is equal to said base area of others of said prisms.

17. The light-guide configuration according to claim 16, wherein:

each one of said prisms has an apex angle; and said apex angle of each one of said prisms decreases along said principal direction of said optical signal line.

18. The light-guide configuration according to claim 16, wherein:

each one of said prisms has an apex angle;

said apex angle of each one of said prisms is dependent upon where said one of said prisms is located along said principal direction of said optical signal line; and said apex angle of each one of said prisms being less than a preceding one of said prisms located along said principal direction of said optical signal line.

19. An optical printed circuit board, comprising: a plurality of light-guide configurations disposed in parallel; each one of said plurality of said light-guide configurations including:

an optical signal line having a principal direction for carrying electromagnetic radiation along said principal direction;

a plurality of optical access points for coupling electromagnetic radiation in a direction that is substantially perpendicular to said principal direction of said optical signal line, said plurality of optical access points configured along said principal direction of said optical signal line;

a plurality of diffusers configured within said optical signal line, each one of said plurality of said diffusers being assigned to a respective one of said plurality of said optical access points; and a plurality of substantially flat electrooptical components;

each one of said plurality of said optical access points having a coupling surface;

each one of said plurality of said substantially flat electrooptical components configured on said coupling surface of a respective one of said plurality of said optical access points;

each one of said plurality of said substantially flat electrooptical components including:
 a central emission region,
 at least one light-emitting device for sending out optical signals, said light-emitting device being configured in said central emission region,
 a sensor region configured around said emission region,
 at least one light-sensing device for sensing optical signals, said light-sensing device being configured in said sensor region,
 a reflector region configured around said sensor region for reflecting incident electromagnetic radiation,
 a device for driving said light-emitting device based on incoming electrical signals, and
 a device for outputting electrical signals based on received optical signals;

each one of said plurality of said diffusers interacting with a respective one of said plurality of said optical access points such that part of the radiation carried in said optical signal line can be coupled out by said one of said plurality of said diffusers and said one of said plurality of said optical access points to a respective one of said plurality of said electrooptical components; and each one of at least some of said plurality of said electrooptical components providing incident radiation being coupled into said optical signal line by a respective one of said plurality of said optical access points and a respective one of said plurality of said diffusers.

* * * * *